United States Patent [19]

Ashton et al.

[11] 4,061,132

[45] Dec. 6, 1977

[54] CONTROL VALVE MEANS PARTICULARLY ADAPTED FOR SWIMMING POOL HEATER INSTALLATIONS EMBODYING A SOLAR HEATER

[76] Inventors: Larry Ashton, 1791 Ide Court, Thousand Oaks, Calif. 91360; Leo Block, 4188 Lake Harbor Lane, Westlake Village, Calif. 91361

[21] Appl. No.: 699,622

[22] Filed: June 25, 1976

[51] Int. Cl.² ................................................ F24J 3/02
[52] U.S. Cl. ............................... 126/271; 137/625.29; 237/1 A; 165/18
[58] Field of Search ..................... 237/1 A; 165/18; 126/270, 271; 137/625.29

[56] References Cited

U.S. PATENT DOCUMENTS

| | | | |
|---|---|---|---|
| 2,713,252 | 7/1955 | Jackson et al. | 165/18 |
| 2,962,437 | 11/1960 | Lindsay | 137/625.29 |
| 3,056,574 | 10/1962 | Greenawalt | 137/625.29 |
| 3,677,291 | 7/1972 | Laws | 137/625.29 |
| 3,868,945 | 3/1975 | Konopka | 126/271 |
| 3,889,742 | 6/1975 | Rush et al. | 165/18 |
| 3,910,490 | 10/1975 | Saypalia, Jr. | 237/1 A |

*Primary Examiner*—Kenneth W. Sprague

[57] ABSTRACT

A five-way valve embodying a cylindrical body with valve seats and cooperating valve discs operable by a stem and having associated inlet and outlet ports. The stem is actuatable by pistons in the cylindrical body. The pistons are driven by pressure under the control of three-way valves. The valve structure is adaptable for use in a swimming pool heating system having a primary pool heater and also a solar heater. The water is circulated by a pump pumping through a filter. The three-way valves are controlled in response to a thermostat responsive to temperature at the solar heater. The three-way valves respond to water pressure differential as between the upstream and downstream sides of the pump in the system.

4 Claims, 4 Drawing Figures

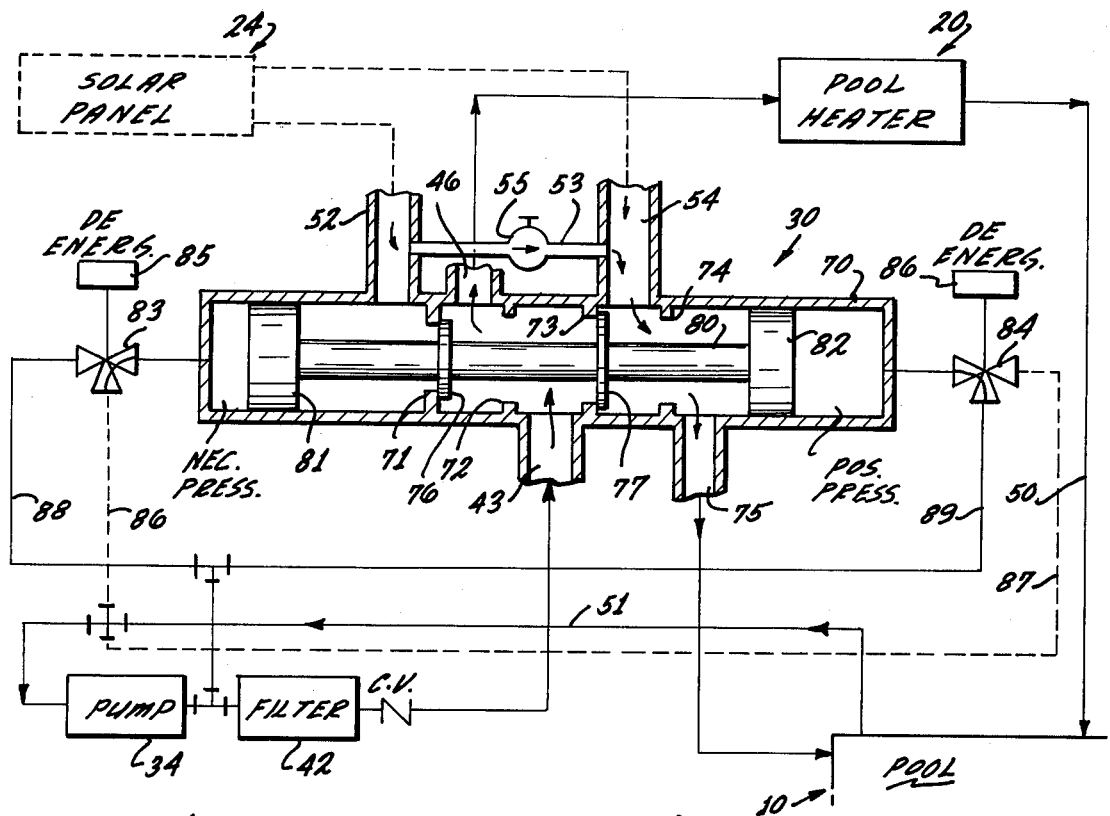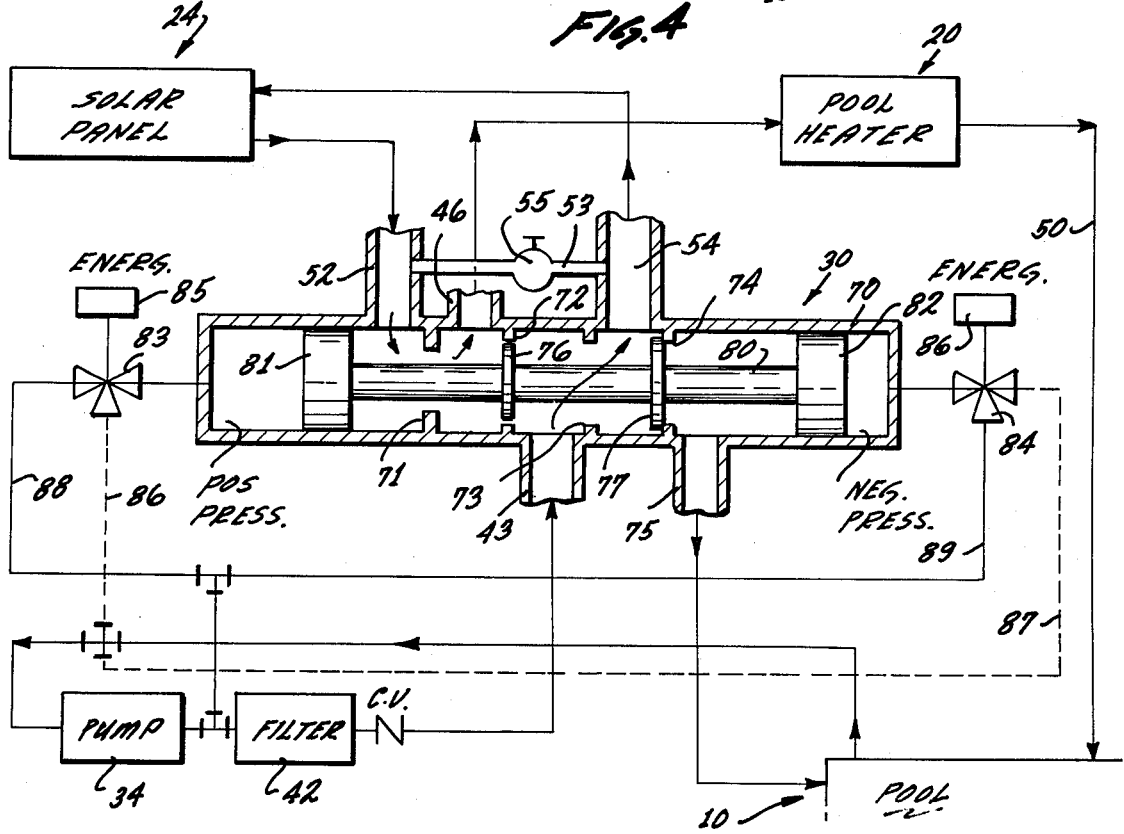

CONTROL VALVE MEANS PARTICULARLY ADAPTED FOR SWIMMING POOL HEATER INSTALLATIONS EMBODYING A SOLAR HEATER

BACKGROUND OF THE INVENTION

1. Field of the Invention

The field of the invention is that of multiported valves, more particularly a five-way valve having inlet and outlet ports, valve seats and valve members, the valve members being actuatable by a stem. In the exemplary form of the invention the stem is actuated by pistons in response to pressure controlled by three-way valves. The valve structure is particularly adapted for use in a swimming pool heating system having a primary heater and a solar heater as described in detail hereinafter.

2. Description of the Prior Art

Valves having multiple ports as such are known, such valves typically involving a cylindrical body having side ports with internal valve seats and valve members cooperable with the ports. Typical valves of this type in the prior art may be operated in various ways. Swimming pool heater systems are, of course, well known in the art, such systems including systems having a primary heater and a solar heater as well, water being circulated by a pump through a filter. There are known systems wherein the flow is controlled in response to a temperature responsive instrument responsive to temperature at the solar heater to cause the flow of water either to go through the solar heater or to not go through it. Known systems of the prior art have not utilized a multiple ported valve of the type referred but rather have utilized one or more individual valves. Such prior art systems have been subject to certain disadvantages. One disadvantage was that when the solar heater was in operation the flow through the primary path of flow was not completely cut off, resulting in a lack of efficiency. Furthermore, such systems have lacked the specific advantageous features outlined hereinafter, as particularly identified in the objects and in the detailed description and the claims. Known prior art patents are U.S. Pat. Nos.: 3,107,052; 3,513,828; 3,599,626; 3,781,925; 3,868,945; 3,616,915; 3,815,574; 3,859,980; 3,906,928; and 3,910,490.

SUMMARY OF THE INVENTION

As referred to in the foregoing, the invention resides in a five-way multiported valve embodying a cylindrical body with side ports, valve seats, and valve members operated by a stem which in the exemplary form of the invention is driven by way of actuated pistons. This valve mechanism is particularly adapted for use in swimming pool heating system having a primary heater and a solar heater, water being circulated by way of a pump pumping through a filter, there being alternate paths of flow, including the solar heater or not including the solar heater. Flow is controlled by the five-way valve in response to a temperature responsive instrument responsive to temperature of the solar heater. The pressure acting on the pistons which drive the valve stem is controlled by three-way valves which are in turn responsive to the temperature responsive instrument. The three-way valves respond to the differential water pressure which exists as between the upstream and downstream side of the pump in the system. Alternatively, the actuating pressure could be hydraulic pressure provided by a hydraulic pump, or other pressure sources.

The valve structure and system achieve and realize a number of specific objects as will be referred to and which will be more fully appreciated from the following detailed description.

A primary object of the invention is to provide an improved multiported valve structure of the type having a cylindrical body with valve seats and cooperating valve members wherein the capability is realized of controlling alternate flow paths as well as a drainage path in a unitary structure.

A further object is to provide an improved valve of this type wherein two pistons are provided for actuating a valve stem, responsive to pressure within the valve body controlled by separate valve means at each end of the body.

A further object is to provide a valve structure as in the foregoing having an inlet and having outlets providing for control of flow alternately through first and second paths of flow and a further outlet port for drainage purposes.

A further object is to provide an improved control arrangement for swimming pool heater systems embodying a solar heater utilizing the improved valve structure as referred to in the foregoing.

Further objects reside in the realization in a swimming pool heater control system of full control of flow in both alternate paths of flow; also to realize full control in both paths of flow.

A further object is to realize the capability of complete drainage of the solar heater when desirable. Realization of this object is by way of a bypass between connections to the multiport valve with a fixed orifice in the bypass.

Further objects and additional advantages of the invention will become apparent from the following detailed descriptions and annexed drawings.

BRIEF DESCRIPTION OF THE DRAWINGS

FIG. 3 is a schematic cross-sectional view of the valve structure and its relationship to the system, showing the valve in one of the two positions; and FIG. 4 has a view similar to that of FIG. 3 with the valve at its other position.

DESCRIPTION OF THE PREFERRED EMBODIMENT

Figure 1:
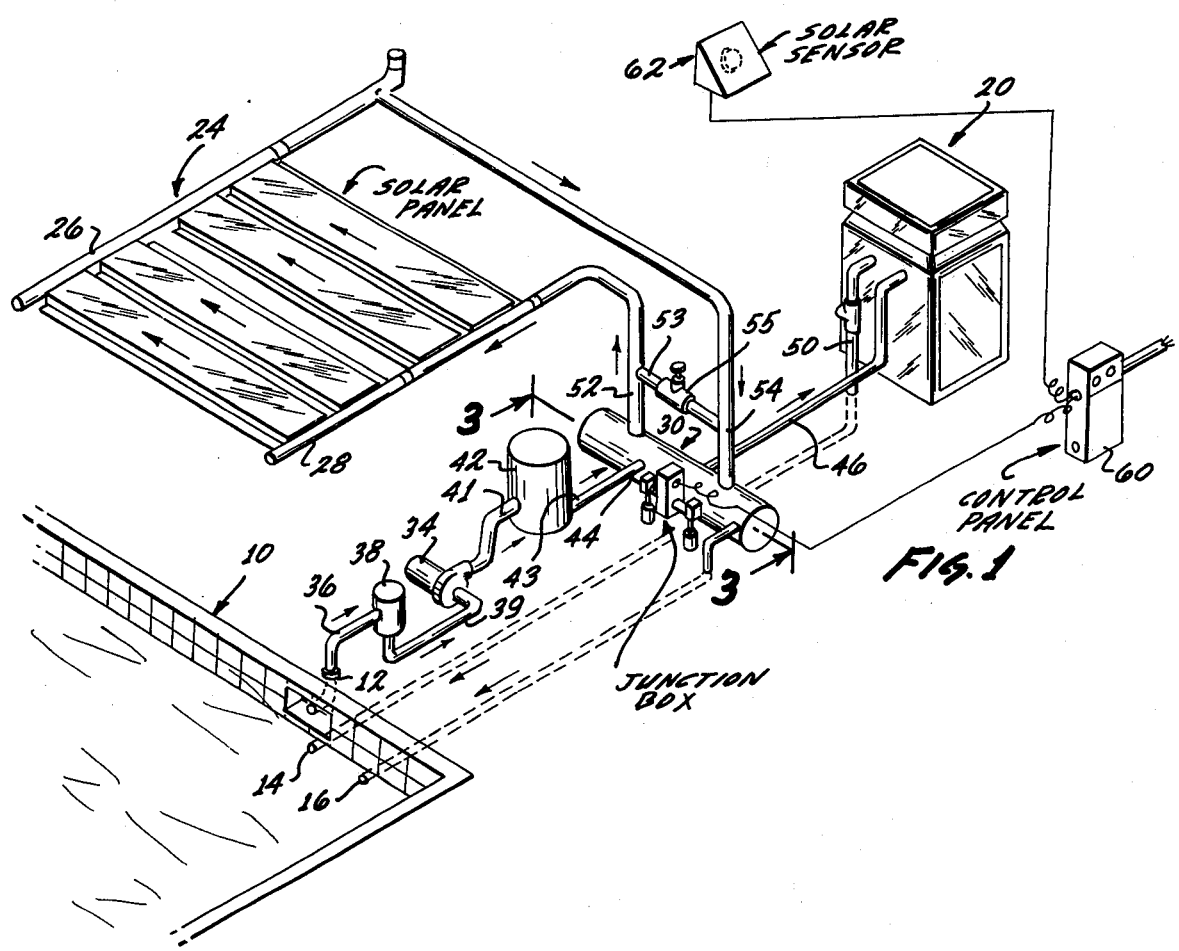
FIG. 1 is a schematic illustration of a swimming pool heating system embodying the invention.

Referring to FIG. 1 of the drawings, numeral 10 designates schematically a typical swimming pool having an outlet plumbing fitting 12 and inlet connections 14 and 16.

Numeral 20 designates a swimming pool heater and it may be of the type shown in U.S. Pat. No. 3,623,458.

Numeral 24 designates a solar heater or absorber having heating panels with headers 26 and 28. The solar heater 24 may belike that disclosed in patent application Ser. No. 602,592, filed Aug. 7, 1975, owned by a common assignee.

Numeral 30 designates the multiported valve structure utilized for controlling the system and as will be described more in detail hereinafter.

Numeral 34 designates a pump of commercial type which pumps water through the system. Water flows from fitting 12 through a pipe 36 to a strainer 38 connecting to the pump through pipe 39. The pump pumps through pipe 41 to filter 42 which connects through pipe 43 to inlet 44 of valve structure 30. Numeral 46 designates an outlet pipe connection from the valve structure 30 to the heater 20. The return line from the heater 20 is designated at 50.

Numerals 52 and 54 designate additional connections to the valve structure 30 which connect to the headers 26 and 28 of the heat absorber 24. The valve structure 30 will be described more in detail presently. Numeral 53 designates a by-pass connection with valve 55 and a fixed orifice in it. The by-pass is schematically shown and may be constructed as an integral part of the valve.

Numeral 60 designates an electrical control panel to which power is supplied as will be referred to in more detail presently. The valve 30 is controlled by a solar heat sensor, that is, a temperature responsive device responsive to temperature at the solar heater as designated by the numeral 62 and as will be described more in detail presently.

Figure 2:
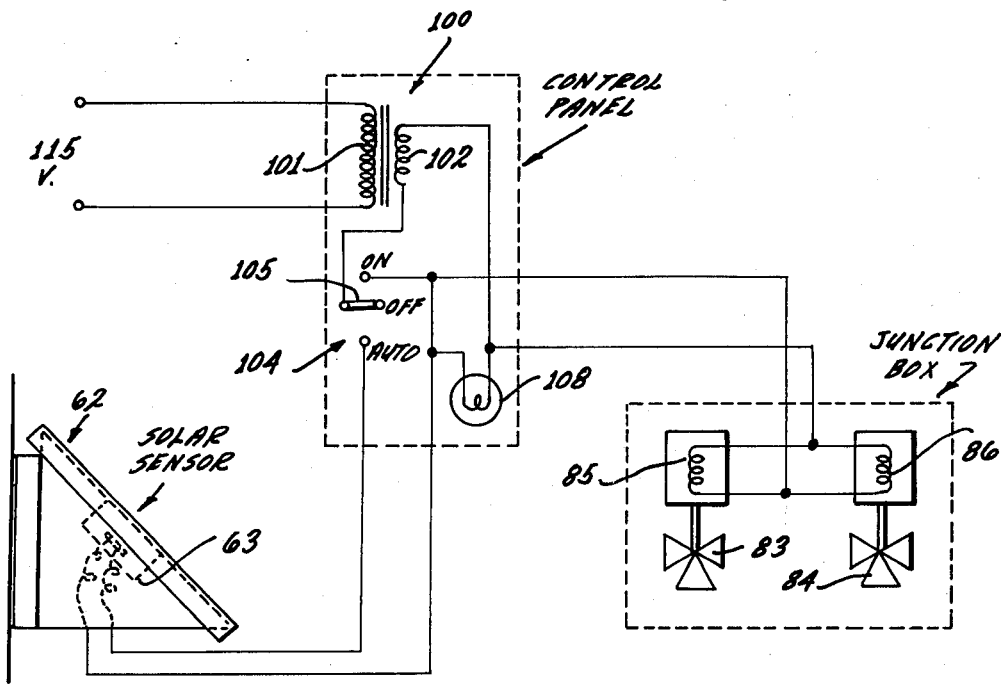
FIG. 2 is an electrical circuit diagram of the electrical controls.

FIGS. 3 and 4 show the value structure 30 more in detail and its relationship to the other components of the system. The valve structure as schematically shown embodies a cylindrical housing or casing 70. Within the housing are valve seats designated by the numerals 71, 72, 73 and 74, cooperable with valve discs 76 and 77; the valve discs or valve members are on a stem 80 and on the ends of the stem are piston members 81 and 82, operable within the bore of the housing 70. Numerals 83 and 84 designate three-way valves of typical construction for control of pressure in the ends of the housing 70 acting on the pistons 81 and 82. The three-way valves 83 and 84 are actuated by solenoid windings 85 and 86 (FIG. 2). The valves 83 and 84 have connections to the inlet side of pump 34 through lines 86 and 87 and they have connections to the discharge side of pump 34 through lines 88 and 89. The inlet connection 43 is between the valve seats 72 and 73. The connection 52 from the solar heater is to the left of the valve. seat 71. The connection 46 to the pool heater is between the seat 71 and 72. The connection 54 to the solar heater is between the seat 73 and 74. The drain connection 75 is to the right of the seat 74.

FIG. 3 shows the valve structure 30 positioned for flow of water direct to the primary pool heater 20 without using the solar heater 24. FIG. 4 shows the valve structure 30 in position for flow through the solar heater 24 and then back through the valve structure and then through the primary heater 20 to the pool.

There is a bypass connection 53 as previously indicated between the connections 52 and 54 of the valve 30 and in it there is also fixed orifice. This arrangement allows for drainage from the solar heater through the connection 75 where the valve 30 is in the position of FIG. 3.

FIG. 2 shows the preferred electric control circuit. The solar sensor 62 preferably has a small sheet metal cabinet housing that includes a surface type thermostat 63 attached to the underside of the upper surface of the cabinet. The top side of the upper surface is painted black for heat absorption purposes. The cabinet is constructed so that it can be mounted to a vertical or horizontal surface and in both positions it can shed water. The thermostat can be of any suitable type. FIG. 2 shows schematically typical installation.

In FIG. 2, numeral 100 designates a transformer connected to a suitable power supply having a primary winding 101 and a secondary winding 102. Numeral 104 designates a manual switch having a switch member 105 having an off position; an on position; an automatic position. Numeral 108 designates a signal light. Windings 85 and 86 of the three-way valves 83 and 84 are connected as shown in FIG. 2. If the manual switch is placed in the on position, two three-way valves are energized. When the switch is placed in the automatic position, they are energized responsively to the thermostat 63.

OPERATION

The system operates in the following manner. With the valve 30 in the position of FIG. 3, the pump pumps through the filter and through the connection 43 into the valve body and through the outlet connection 46 to the pool heater and to the pool, the return from the pool being through the line 50 as shown in FIG. 1. In this mode of operation both the three-way valves 83 and 84 are de-energized. These valves have connections as described through lines 88 and 89 to the discharge side of the pump 34. They have connections through lines 86 and 87 to the line 51 ahead of the pump 34. In the mode of operation of FIG. 3, both valves are de-energized. Valve 83 is in a position to relieve pressure to the left of piston 81 through the lines as shown and valve 84 is in a position to admit positive pressure to the right of piston 82 through the lines as shown. Valve member 76 seats on seat 71 and valve member 77 seats on seat 73 so that the flow is as described.

In this position the solar heater can drain completely out of line 75. The fixed orifice in bypass 53 allows complete drainage. The bypass may be built into the valve.

When the thermostat 63 responds to temperature at the solar sensor indicating that solar absorber can apply heat to the water, the solenoids 85 and 86 of the three-way valves 83 and 84 are energized moving these valves to the opposite positions. In these positions valve 83 is positioned to admit positive pressure to the left of piston 81 and the valve 84 is positioned to relieve the pressure to the right of piston 82 through the lines as shown and described. The valve members or discs 76 and 77 are now in the position as shown in FIG. 4. Flow now is from the inlet connection 43 through the valve body and through the connection 54 to the solar heater and back through connection 52 and to the interior of the valve body and then through connection 46 to the primary heater 20 and to the pool. When the thermostat 63 terminates its response, the position of the three-way valves is reversed and the valve 30 returns to the position of FIG. 3.

From the foregoing those skilled in the art will readily understand the nature and construction of the invention and the manner in which it achieves and realizes all of the objects as set forth in the foregoing as well as the manifold advantages of the invention.

The foregoing disclosure is representative of a preferred form of the invention and is to be interpreted in an illustrative rather than a limiting sense the invention to be accorded the full scope of the claims appended hereto.

What is claimed is:

1. A valve structure adapted for controlling flows of water through a first path and a second path, the structure including a casing having an inlet, a first outlet for said first path, and a second outlet for said second path, valve means and seat means in said housing positionable whereby to direct water alternatively from the inlet to the first outlet only or from the inlet to the second outlet only and actuator means, a heat exchanger in the first path of flow and a heat exchanger in the second path of flow, one of said heat exchangers being a solar absorber, the said heat exchangers being connected to a swimming pool, said housing having a second inlet adapted to receive return water from said second path, the said valve and seat means including valve means and seat means relatively positionable whereby water from said second inlet is communicated to said first outlet whereby water flows through said first path and second path in series when water is directed to said second outlet.

2. A system as in claim 1, in which said casing has a third outlet, a bypass connection between the inlet and the outlet of the solar absorber and said third outlet having a position whereby the solar absorber can drain through the third outlet.

3. A system as in claim 1, including control means for positioning said valve structure, pump means for pumping water through the system including a pump, said control means being pressure responsive and including connections to the inlet side and discharge side of the pump.

4. A system as in claim 3, wherein the said casing is cylindrical, the said valve means including discs cooperable with the seat means, said actuating means including a stem connected to the valve discs, piston means connected to the stem and control means responsive to pressure, the system including a circulating pump, the control means including connections to the inlet and discharge sides of the pump.

* * * * *